No. 676,671. Patented June 18, 1901.
A. ALLENDY.
DEVICE EMPLOYED IN COOKING UTENSILS.
(Application filed Sept. 15, 1900.)
(No Model.)
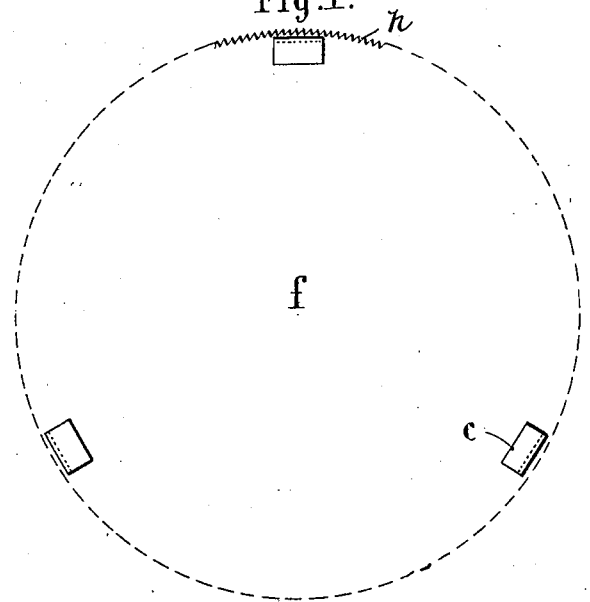
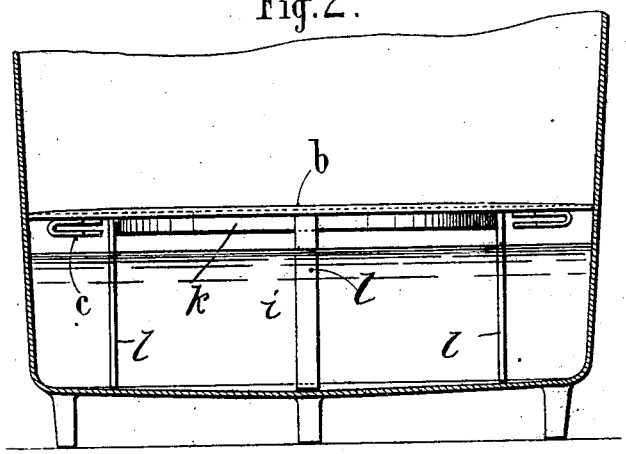

UNITED STATES PATENT OFFICE.

ARMAND ALLENDY, OF PARIS, FRANCE.

DEVICE EMPLOYED IN COOKING UTENSILS.

SPECIFICATION forming part of Letters Patent No. 676,671, dated June 18, 1901.

Application filed September 15, 1900. Serial No. 30,150. (No model.)

*To all whom it may concern:*

Be it known that I, ARMAND ALLENDY, architect, a citizen of the French Republic, residing at Paris, France, (and having my post-office address 21 Avenue de Messine, in the said city,) have invented certain new and useful Improvements in Devices to be Employed in Cooking or Heating in Pots, Saucepans, or the Like, of which the following is a specification.

My invention has for its object to provide a device whereby the food or other substance being cooked or heated in a pot, saucepan, or the like is prevented from adhering to the bottom of the said pot, saucepan, or the like and becoming burned even when the heat of the fire is intense, and the operation is carried on for a long time and this without need for stirring the contents of the pot, saucepan, or the like during the operation of cooking or heating.

In order that my invention may be fully understood, I shall now proceed to describe it with reference to the accompanying drawings, in which—

Figure 1 is a plan view of the device; and Fig. 2 is a transverse section of the lower portion of a pot, saucepan, or the like with my improved device shown in elevation therein.

Like characters refer to like parts in both figures.

The letter $f$ represents a disk, the periphery of which is serrated, as at $h$, and which has on its under side a series of substantially U-shaped legs, as $c$, one branch of each of which is secured to the disk in the direction of its length. The serrated edge $h$ is adapted to engage the inner surface of a pot, saucepan, or the like, somewhere near the bottom of the latter, and the disk is adapted to divide the pan into superposed compartments, communication between which is afforded by the serrated edge, so that the water used in cooking can freely circulate between such compartments, and as the disk supports the food there is no danger of the latter being burned or scorched.

The feet $c$ may rest upon the bottom of the pan, or the disk can be supported by a lifter which consists of a body, as $k$, having a plurality of legs, as $l$, which extend a greater distance below the under surface of the disk than the free branches of the U-shaped legs and which are sustained by the bottom of the pan. When the disk is on the lifter, it is higher than when supported by the legs $c$.

Having now particularly described and ascertained the nature of my invention and in what manner the same may be performed, I declare that what I claim is—

A device of the class specified to be used in connection with a cooking vessel consisting of a disk adapted to engage the inner surface of a vessel below its upper edge to divide the same into superposed compartments, said disk being adapted to support food to be cooked and having means to afford communication between said compartments for the passage of cooking fluid, a plurality of elongated substantially U-shaped legs one branch of each being secured to the under side of the disk in the direction of its length, and a lifter consisting of a body portion and a series of depending legs extending a greater distance below the under surface of the disk than the free branches of said U-shaped legs, the said body portion being arranged to sustain the disk.

In testimony whereof I have hereunto set my hand in presence of two subscribing witnesses.

ARMAND ALLENDY.

Witnesses:
EDWARD P. MACLEAN,
EMILE KLOBE.